United States Patent
Ohashi

(10) Patent No.: US 10,605,375 B2
(45) Date of Patent: Mar. 31, 2020

(54) REGULATING VALVE WITH PLANETARY GEAR TRANSMISSION

(71) Applicant: Azbil Corporation, Tokyo (JP)

(72) Inventor: Tomofumi Ohashi, Tokyo (JP)

(73) Assignee: Azbil Corporation, Tokyo (JP)

( * ) Notice: Subject to any disclaimer, the term of this patent is extended or adjusted under 35 U.S.C. 154(b) by 87 days.

(21) Appl. No.: 15/887,223

(22) Filed: Feb. 2, 2018

(65) Prior Publication Data

US 2018/0224017 A1 Aug. 9, 2018

(30) Foreign Application Priority Data

Feb. 3, 2017 (JP) .................................. 2017-018445

(51) Int. Cl.
*F16H 1/28* (2006.01)
*F16K 31/04* (2006.01)
*F16K 31/53* (2006.01)

(52) U.S. Cl.
CPC .......... *F16K 31/045* (2013.01); *F16K 31/043* (2013.01); *F16K 31/535* (2013.01); *F16H 1/28* (2013.01); *F16H 1/2836* (2013.01)

(58) Field of Classification Search
CPC ........ F16H 1/28; F16H 1/2836; F16K 31/045; F16K 31/535
See application file for complete search history.

(56) References Cited

U.S. PATENT DOCUMENTS 3,370,832 A * 2/1968 Spyridakis ............... B66D 3/22
254/344

3,705,522 A * 12/1972 Ogawa ...................... F16H 1/28
475/341

(Continued)

FOREIGN PATENT DOCUMENTS

JP S62-137425 A 6/1987
JP H08-178119 A 7/1996

(Continued)

OTHER PUBLICATIONS

Korean Intellectual Property Office, "Notification of Reason for Refusal," issued in Korean Patent Application No. 10-2018-0013316, which is a counterpart to U.S. Appl. No. 15/887,223, dated Jun. 3, 2019, 8 pages (4 pages of English Translation of Office Action and 4 pages of Original Office Action).

(Continued)

*Primary Examiner* — Stacey A Fluhart
(74) *Attorney, Agent, or Firm* — Amester, Rothstein & Ebenstein LLP

(57) ABSTRACT

A setting/operating device includes a sun gear that rotates by receiving a rotating force from a driving motor; a first internal gear that has teeth on the inner peripheral surface thereof, the first internal gear being provided rotatably so as to surround the sun gear; a plurality of planetary gears that are disposed between the sun gear and the first internal gear, engaged with the sun gear and the first internal gear, and capable of rotating on axes thereof while revolving around the sun gear; a rotation mechanism that rotates by receiving rotating forces of the plurality of planetary gears; an output shaft that is coupled to the rotation mechanism; a housing that accommodates the sun gear, the first internal gear, the plurality of planetary gears, and the rotation mechanism; and a rotation control mechanism that switches between a rotatable state and an unrotatable state of the first internal gear.

5 Claims, 6 Drawing Sheets

(56) References Cited

U.S. PATENT DOCUMENTS

| | | | | |
|---|---|---|---|---|
| 3,943,780 | A | * 3/1976 | Klaue | F16H 1/2836 |
| | | | | 475/317 |
| 2009/0270220 | A1 | 10/2009 | Fukano et al. | |
| 2011/0021307 | A1* | 1/2011 | Davies | F16H 1/28 |
| | | | | 475/254 |
| 2014/0309077 | A1* | 10/2014 | Heglund | F16H 3/52 |
| | | | | 475/311 |
| 2016/0091053 | A1* | 3/2016 | Hansson | F16H 1/28 |
| | | | | 475/346 |
| 2017/0152788 | A1* | 6/2017 | Shepherd | F01P 3/20 |
| 2018/0283503 | A1* | 10/2018 | Georgiev | F16H 3/56 |

FOREIGN PATENT DOCUMENTS

| | | |
|---|---|---|
| JP | 2016-023684 A | 2/2016 |
| KR | 200450505 Y1 | 10/2010 |
| KR | 101073405 B1 | 10/2011 |

OTHER PUBLICATIONS

The State Intellectual Property Office of People's Republic of China, "The First Office Action," issued in Chinese Patent Application No. 201810166434.8, which is a counterpart to U.S. Appl. No. 15/887,223, dated Feb. 28, 2019, 15 pages (8 pages of English Translation of Office Action and 7 pages of Original Office Action).

* cited by examiner

REGULATING VALVE WITH PLANETARY GEAR TRANSMISSION

CROSS-REFERENCE TO RELATED APPLICATION

The present application claims the benefit of and priority to Japanese Patent Application No. 2017-018445, filed on Feb. 3, 2017, the entire contents of which are incorporated by reference herein.

TECHNICAL FIELD

The present invention relates to a setting/operating device for operating equipment and relates, for example, to a setting/operating device for operating a valve stem of a rotary-type regulating valve.

BACKGROUND ART

An electric setting/operating device (actuator) for operating a rotary-type regulating valve, such as a butterfly valve, drives a valve stem coupled to an output shaft by transmitting a rotating force generated from a driving motor to the output shaft via a gear mechanism.

Such a setting/operating device generally has an emergency shutoff function that closes the regulating valve when the supply of electric power is stopped by interruption of electric service or the like. There is a known spring return type setting/operating device that closes a regulating valve by forcibly rotating an output shaft using a spring unit provided separately from the above gear mechanism as an electric setting/operating device having this emergency shutoff function.

A driving motor of the electric setting/operating device generally has a detent torque. Accordingly, when the supply of electric power to the setting/operating device is stopped, it is difficult to rotate the gear mechanism coupled to the driving motor from the output shaft side using the torque from the spring unit. Therefore, a general spring return type setting/operating device has a clutch mechanism for disconnecting the coupling between the driving motor and the gear mechanism. However, in spring return operation that drives the output shaft using a torque from the spring unit in the state in which the coupling to the driving motor is disconnected by the clutch mechanism, the rotation speed of the output shaft is higher than in motor operation that drives the output shaft using the rotating force of the driving motor. Accordingly, when the rotation of the output shaft is stopped by return operation, a large impact (referred to below as a "return impact") is applied to gears included in the gear mechanism. Therefore, the conventional spring return type setting/operating device has a brake mechanism to reduce a return impact applied to gears, in addition to the clutch mechanism described above (see PTL 1 and PTL 2).

CITATION LIST

Patent Literature

[PTL 1] JP-A-8-178119
[PTL 2] JP-A-2016-023684

SUMMARY

However, in setting/operating devices that transmit a rotating force from the driving motor to the output shaft via a power transmitting mechanism including a gear mechanism having connected spur gears or a planetary gear mechanism as the setting/operating devices disclosed in PTL 1 and PTL 2, a return impact is applied to specific teeth of gears every time when the rotation of the output shaft is stopped by spring return operation. Accordingly, even if a return impact is reduced by installing a brake mechanism, since a return impact is applied to the same teeth of a gear every time, the service life of the setting/operating device is determined by the service life of the specific teeth. This problem also arises when a paradox planetary gear mechanism is adopted as the power transmitting mechanism of a setting/operating device.

The invention addresses the above problem with an object of prolonging the service life of gears included in a power transmitting mechanism of an electric setting/operating device having a spring unit.

A setting/operating device (100, 100A, 100B, 100C, 100D) according to the invention includes a sun gear (2) that rotates by receiving a rotating force from a driving motor (8); a first internal gear (5) that has teeth on an inner peripheral surface thereof, the first internal gear being provided rotatably so as to surround the sun gear; a plurality of planetary gears (4) that are disposed between the sun gear and the first internal gear, are engaged with the sun gear and the first internal gear, and are capable of rotating on axes thereof while revolving around the sun gear; a rotation mechanism (6, 6A, 6B) that rotates by receiving rotating forces of the plurality of planetary gears; an output shaft (7) that is coupled to the rotation mechanism; a housing (10) that accommodates the sun gear, the first internal gear, the plurality of planetary gears, and the rotation mechanism; and a rotation control mechanism (3) that switches between a rotatable state and an unrotatable state of the first internal gear.

In the setting/operating device, the rotation control mechanism may put the first internal gear in the unrotatable state when electric power is supplied and may put the first internal gear in the rotatable state when electric power is not supplied.

In the setting/operating device, the rotation control mechanism may put the first internal gear in the unrotatable state by fixing the first internal gear to the housing when electric power is supplied and may put the first internal gear in the rotatable state by releasing the fixed first internal gear when electric power is not supplied.

In the setting/operating device (100, 100B, 100C), the rotation control mechanism (3) may include a casing (31) that is fixed to the housing, a first member (33) that is disposed in the casing, the first member being made of magnetic material, a spring member (35) that has one end fixed to the casing and the other end coupled to the first member, a second member (34) disposed in the casing spaced apart from the first member so as to face the first member, the second member being made of magnetic material coupled to the first internal gear, and a magnetic excitation coil (32) that excites the first member and the second member.

In the setting/operating device (100A, 100D), the rotation control mechanism (3A) may include an iron core (36) disposed between an inner wall of the housing and the first internal gear in the housing and a magnetic excitation coil (32) that excites the iron core, and at least parts of the housing and the first internal gear may be made of magnetic material, the parts facing the iron core.

In the setting/operating device, the rotation mechanism may include a second internal gear (6) that is disposed concentrically with the first internal gear, has teeth to be engaged with the planetary gears on the inner peripheral surface thereof, and is provided rotatably.

In the setting/operating device, the rotation mechanism may include carriers (6A and 6B) that rotatably support the plurality of planetary gears on the axes thereof and transmit the motion of revolution of the plurality of planetary gears to the output shaft.

In the above description, as an example, reference numerals in drawings corresponding to components of the invention are designated in parentheses.

As described above, according to the invention, it is possible to prolong the service life of gears included in the power transmitting mechanism of the electric setting/operating device having a spring unit.

DETAILED DESCRIPTION

Figure 1:
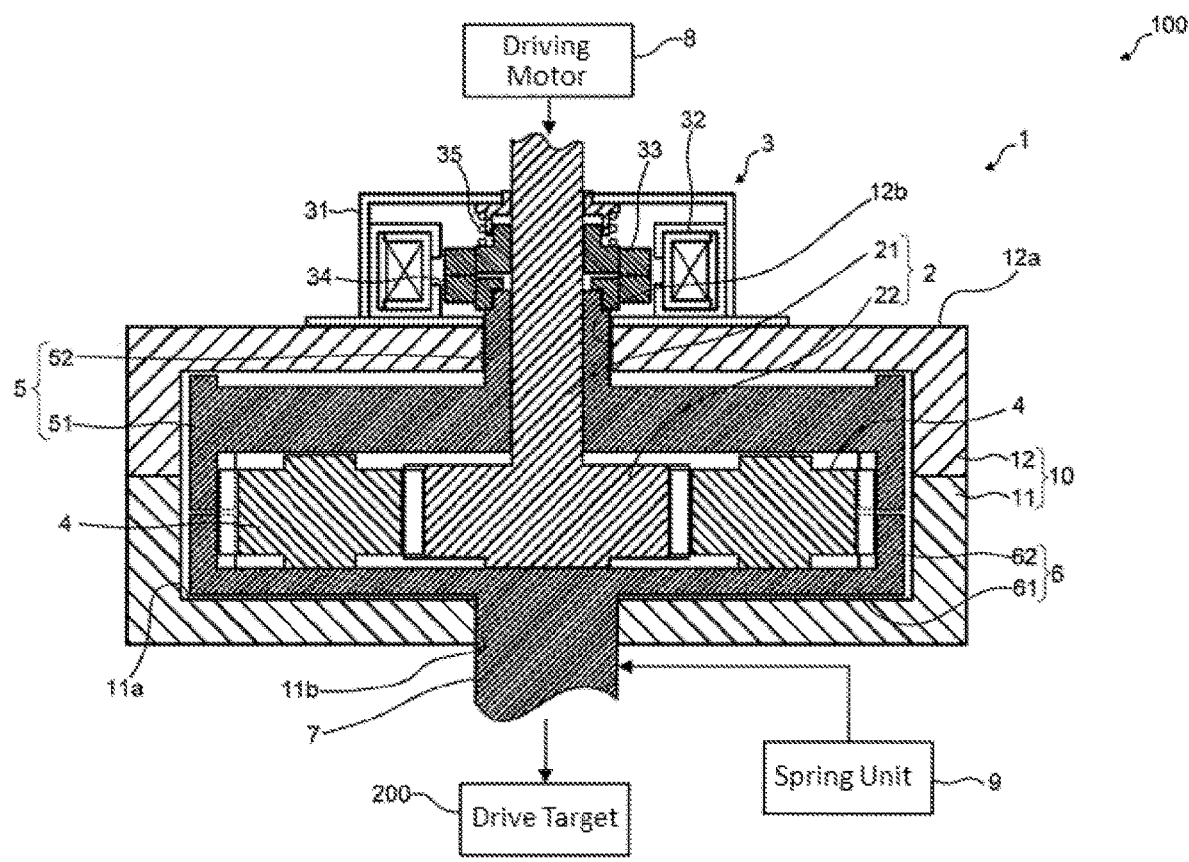
FIG. 1 is a cross-sectional view illustrating a power transmitting mechanism of a setting/operating device according to embodiment 1.

Embodiments of the invention will be described below with reference to the drawings. It should be noted that components common to the individual embodiments are given the same reference numerals to omit repeated descriptions.

Embodiment 1

FIG. 1 is a cross-sectional view illustrating the power transmitting mechanism of the setting/operating device according to embodiment 1.

A setting/operating device 100 according to embodiment 1 is, for example, an electric setting/operating device (actuator) that operates a rotary-type regulating valve, such as a butterfly valve, used for process control of a flow rate in a plant or the like. For example, the setting/operating device 100 controls the valve opening of a regulating valve by operating the valve stem based on an operation signal supplied from a positioner provided outside. In addition, the setting/operating device 100 has the emergency shutoff function that closes a regulating valve by spring return operation that drives the output shaft using a torque from a spring unit 9 during power-off.

Specifically, when electric power is supplied, the setting/operating device 100 transmits a rotating force from a driving motor 8 to the valve stem as a drive target 200 by suppressing the rotation of a first internal gear 5, which is one of the gears constituting a power transmission portion 1, so as to cause the power transmission portion 1 to function as a paradox planetary gear mechanism. In contrast, when electric power is not supplied, the setting/operating device 100 closes the regulating valve by operating the valve stem by enabling the rotation of the first internal gear 5, integrally rotating a plurality of gears constituting the paradox planetary gear mechanism described above using an input torque from the spring unit 9.

The specific structure of the setting/operating device 100 will be described in detail below.

In the embodiment, the detailed description and illustration of some components of the setting/operating device 100 are omitted to clarify the structure of the power transmitting mechanism of the setting/operating device 100. For example, although the setting/operating device 100 has the electronic circuit portion that controls the rotation of the driving motor 8 based on an operation signal supplied from the positioner, a power supply unit, and the like in addition to electric power transmitting mechanism, the detailed description and illustration of these components are omitted in the embodiment.

As illustrated in FIG. 1, the setting/operating device 100 includes the driving motor 8, the power transmission portion 1, and the spring unit 9.

The driving motor 8 is a component that generates a rotating force for operating the valve stem as the drive target 200 when electric power is supplied to the setting/operating device 100 (during normal operation). The driving motor 8 is an electric motor for which rotation is controlled by supplying power via the electronic circuit portion (not illustrated) described above and the driving motor 8 is, for example, a brushless motor.

The power transmission portion 1 is a function portion that opens and closes the regulating valve by transmitting a rotating force from the driving motor 8 to the valve stem as the drive target 200.

The spring unit 9 is a function portion that closes the regulating valve by operating the valve stem when the supply of electric power to electronic components including the driving motor 8 of the setting/operating device 100 is stopped. The spring unit 9 is a setting/operating device having a spring member such as, for example, a spiral spring. Specifically, the spring unit 9 stores energy by winding the spring member while electric power is supplied to the driving motor 8 or the like and closes the regulating valve by releasing the energy stored in the spring member and driving an output shaft 7, which will be described later, of the power transmission portion 1 when the supply of electric power to the driving motor 8 or the like is stopped.

Next, the specific structure of the power transmission portion 1 will be described.

As illustrated in FIG. 1, the power transmission portion 1 includes a sun gear 2, a rotation control mechanism 3, planetary gears 4, a first internal gear 5, a rotation mechanism 6, and the output shaft 7. These components are accommodated in a housing 10.

The housing 10 is a container in which components of the setting/operating device 100 are accommodated and is made of, for example, metal material. Specifically, the housing 10 accommodates the sun gear 2, the first internal gear 5, the plurality of the planetary gears 4, and a second internal gear 6. More specifically, as illustrated in FIG. 1, the housing 10 includes a bottom portion 11 and a lid portion 12 disposed so as to face each other. The bottom portion 11 includes a supporting surface 11a that rotatably supports the second internal gear 6 and a through-hole 11b that is formed in the supporting surface 11a. The lid portion 12 includes a supporting surface 12a that supports the rotation control mechanism 3 and a through-hole 12b that is formed in the supporting surface 12a.

The sun gear 2 is a component that rotates (rotates on the axis thereof) by receiving a rotating force from the driving motor 8. As illustrated in FIG. 1, the sun gear 2 includes a shaft portion 21 having one end coupled to the rotation shaft of the driving motor 8 and a gear portion 22 coupled to the other end of the shaft portion 21 and having teeth on the outer peripheral surface thereof. The gear portion 22 of the sun gear 2 is accommodated in the housing 10 and the shaft portion 21 of the sun gear 2 projects from the through-hole 12b of the housing 10.

Although the shaft portion 21 and the gear portion 22 may be separate components, a reduction in the number of components is achieved by forming these members integrally.

The first internal gear 5 is a component that is disposed so as to surround the sun gear 2, has teeth on the inner peripheral surface thereof, and is provided rotatably. Specifically, the first internal gear 5 includes a cylindrical supporting portion 52 that rotatably supports the shaft portion 21 of the sun gear 2 and a gear portion 51 that is coupled to one end of the supporting portion 52 and has teeth on inner peripheral surface thereof.

The gear portion 51 of the first internal gear 5 is accommodated in the housing 10 and engaged with the plurality of the planetary gears 4, which will be described later, to guide the rotation of the plurality of the planetary gears 4. The supporting portion 52 of the first internal gear 5 passes through the through-hole 12b of the housing 10 and the shaft portion 21 of the sun gear 2 passes through a cylinder within the supporting portion 52. The supporting portion 52 and the gear portion 51 are, for example, formed integrally with each other.

The planetary gears 4 are engaged with the sun gear 2 and the first internal gear 5 and rotate on the axes thereof while revolving around the sun gear 2. In the setting/operating device 100, the plurality (for example, three) of planetary gears 4 are disposed between the sun gear 2 and the first internal gear 5. FIG. 1 illustrates two planetary gears 4 of the three planetary gears disposed between the sun gear 2 and the first internal gear 5.

The rotation mechanism 6 is a component that rotates by receiving rotating forces of the plurality of planetary gears 4. The rotation mechanism 6 is a second internal gear that is disposed concentrically with the first internal gear 5, has teeth engaged with the planetary gears 4 on the inner peripheral surface thereof, and is provided rotatably. The second internal gear functions as a movable internal gear that transmits the motion of the rotation and revolution of the plurality of the planetary gears 4 to the output shaft 7. The rotation mechanism 6 is also referred to below as "the second internal gear 6." Specifically, the second internal gear 6 has a supporting portion 61 that rotatably supports the sun gear 2 and the plurality of the planetary gears 4, and a gear portion 62 to be engaged with the plurality of the planetary gears 4. The supporting portion 61 is rotatably placed on the supporting surface 11a of the bottom portion 11 of the housing 10.

The output shaft 7 is a component that rotates the valve stem of the regulating valve as the drive target 200 according to the rotating force of the second internal gear 6. Specifically, the output shaft 7 has one end coupled to the second internal gear 6 and the other end coupled to the valve stem as the drive target 200. For example, the output shaft 7 has the same rotation shaft as the second internal gear 6, as illustrated in FIG. 1. The output shaft 7 may be formed integrally with the second internal gear 6 and projects from the through-hole 11b of the bottom portion 11 of the housing 10.

The sun gear 2, the planetary gears 4, the first internal gear 5, the second internal gear 6, and the output shaft 7 are made of resin material (for example, polyacetal resin).

The rotation control mechanism 3 is a function portion that switches between the rotatable state and the unrotatable state of the first internal gear 5. The rotation control mechanism 3 puts the first internal gear 5 in the unrotatable state when electric power is supplied and puts the first internal gear 5 in the rotatable state when electric power is not supplied. Specifically, the rotation control mechanism 3 puts the first internal gear 5 in the unrotatable state by fixing the first internal gear 5 to the housing 10 when electric power is supplied and puts the first internal gear in the rotatable state by releasing the fixed first internal gear 5 when electric power is not supplied. The rotation control mechanism 3 includes, for example, an electromagnetic clutch. In the embodiment, it is assumed that the rotation control mechanism 3 is, for example, an electromagnetic clutch and the rotation control mechanism 3 is also referred to as "the electromagnetic clutch 3." The specific structure of the electromagnetic clutch 3 will be described.

The electromagnetic clutch 3 includes a casing 31, a magnetic excitation coil 32, a first member 33, a second member 34, and a spring member 35.

The casing 31 is a container in which the magnetic excitation coil 32, the first member 33, the second member 34, and the spring member 35 are accommodated and is made of, for example, metal material. The casing 31 has a through-hole through which the shaft portion 21 of the sun gear 2 passes and is fixed to the lid portion 12 of the housing 10.

The first member 33 is disposed in the casing 31. The first member 33 is made of magnetic material and has a through-hole through which the shaft portion 21 of the sun gear 2 passes. The first member 33 functions as an electromagnet by being excited by the magnetic excitation coil 32.

The spring member 35 is a component that fixes the first member 33 to the casing 31. Specifically, the spring member 35 has one end fixed to the casing 31 and the other end coupled to the first member 33.

The second member 34 is spaced apart from the first member 33 in the casing 31 so as to face the first member 33. The second member 34 has a through-hole through which the shaft portion 21 of the sun gear 2 passes and is coupled to the other end of the cylindrical supporting portion 52 of the first internal gear 5. The second member 34 is made of magnetic material, similar to the first member 33, and functions as an electromagnet by being exited by the magnetic excitation coil 32.

The magnetic excitation coil 32 is a component that excites the first member 33 and the second member 34 made of magnetic material according to a current flowing through windings. As illustrated in FIG. 1, the magnetic excitation coil 32 is disposed so as to surround the first member 33 and the second member 34.

Next, the operation principle of the setting/operating device 100 will be described.

First, the case in which electric power is supplied to the setting/operating device 100 will be described.

In this case, the power is supplied not only to the driving motor 8, but also to the electromagnetic clutch 3. That is, when current flows through the magnetic excitation coil 32 included in the electromagnetic clutch 3, the first member 33 and the second member 34 are excited. With this, as illustrated in FIG. 1, the spring member 35 extends, the first member 33 moves toward the lower surface of the casing 31, and the first member 33 is coupled to the second member 34 by a magnetic force.

The first internal gear 5 coupled to the second member 34 is fixed to the housing 10 via the second member 34, the first member 33, the spring member 35, and the casing 31 and enters the unrotatable state. That is, the first internal gear 5 functions as a fixed internal gear. With this, one paradox planetary gear mechanism (reducer) is achieved by the sun gear 2, the plurality of the planetary gears 4, the first internal gear 5 (fixed internal gear), and the second internal gear 6 (movable internal gear).

When the rotation shaft of the driving motor 8 rotates with the first internal gear 5 fixed to the housing 10, the rotating force is transmitted to the sun gear 2 and the sun gear 2 rotates. The rotating force of the sun gear 2 causes the plurality of the planetary gears 4 engaged with the sun gear 2 to revolve along the inner periphery of the gear portion 51 of the first internal gear 5 as a fixed internal gear while rotating on the axes thereof. The rotating forces of the plurality of the planetary gears 4 rotate the second internal gear 6 as a movable internal gear engaged with the plurality of planetary gears 4. With this, the output shaft 7 formed integrally with the second internal gear 6 rotates. The valve stem is coupled to the output shaft 7, the valve stem is rotated by the rotating force obtained by greatly reducing the rotating force of the driving motor 8, and the valve opening of the regulating valve can be controlled.

Next, the case in which the supply of electric power to the setting/operating device 100 is stopped will be described.

Figure 2:
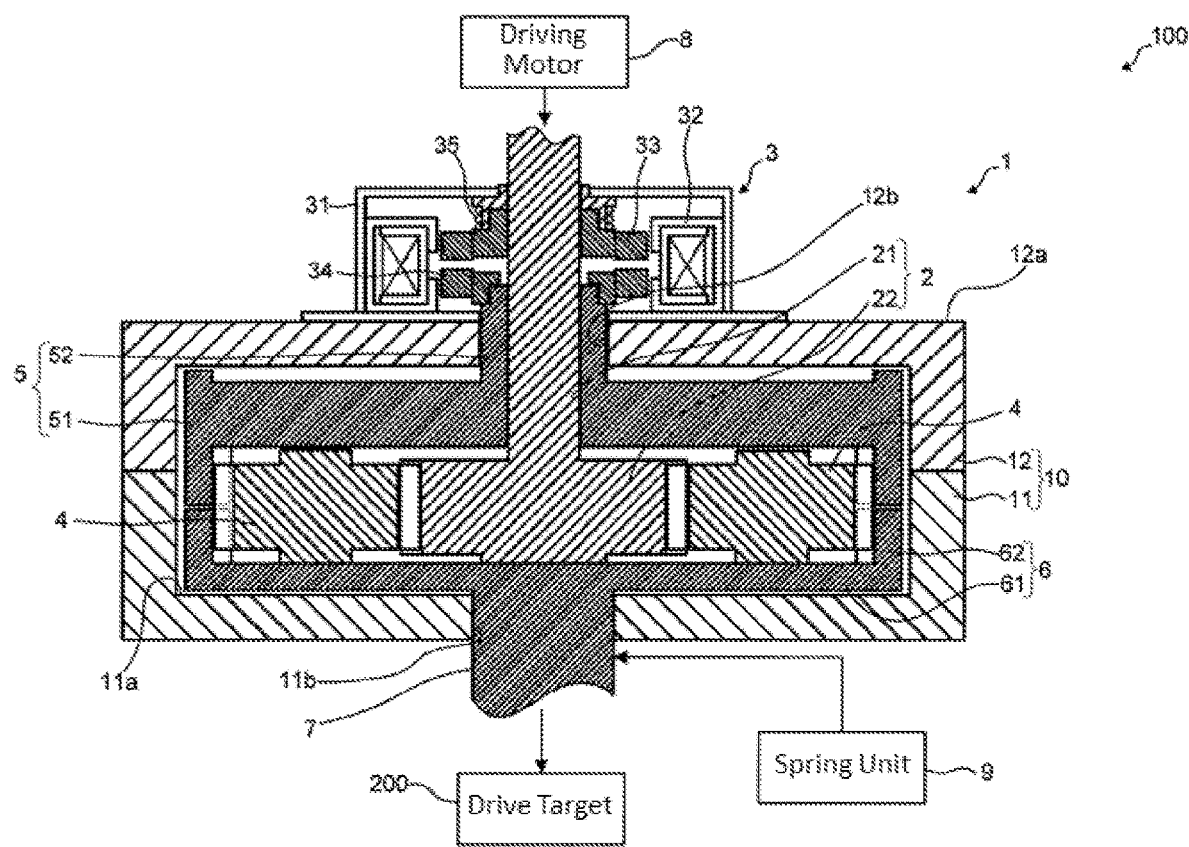
FIG. 2 is a cross-sectional view illustrating electric power transmitting mechanism of the setting/operating device when electric power to an electromagnetic clutch is turned off.

FIG. 2 is a cross-sectional view illustrating the power transmitting mechanism of the setting/operating device when electric power to the electromagnetic clutch is turned off.

Since the supply of the power not only to the driving motor 8 but also to the electromagnetic clutch 3 is stopped in this case, no current flows through the magnetic excitation coil 32 included in the electromagnetic clutch 3. With this, as illustrated in FIG. 2, the spring member 35 shrinks, the first member 33 moves toward the upper surface of the casing 31, and the coupling between the first member 33 and the second member 34 is released. As a result, the first internal gear 5 fixed to the housing 10 is released and the first internal gear 5 enters the rotatable state (clutch release state) in the housing 10. That is, the self-lock function of the paradox planetary gear mechanism including the sun gear 2, the plurality of the planetary gears 4, the first internal gear 5, and the second internal gear 6 is released, thereby enabling the spring unit 9 to operate the output shaft 7 (valve stem).

Specifically, when the energy stored in the spring member of the spring unit 9 is released and a torque is input to the output shaft 7 from the spring unit 9 in the state in which the first internal gear 5 is rotatable, the torque is applied to the second internal gear 6 via the output shaft 7. With this, the rotating force is applied from the second internal gear 6 to the first internal gear 5 and the sun gear 2 via the plurality of the planetary gears 4. At this time, the rotation of the sun gear 2 is suppressed by the detent torque of the driving motor 8 coupled thereto. On the other hand, the second internal gear 6, the plurality of the planetary gears 4, and the first internal gear 5 rotate integrally within the housing 10. At this time, the planetary gears 4 do not rotate on the axes thereof and revolve around the sun gear 2.

Since the second internal gear 6, the plurality of the planetary gears 4, and the first internal gear 5 integrally rotate around the sun gear 2 due to an input torque from the spring unit 9, the output shaft 7 rotates and the regulating valve can be closed.

When the regulating valve is closed by spring return operation in the setting/operating device 100 according to embodiment 1, the second internal gear 6, the plurality of the planetary gears 4, and the first internal gear 5 receive a return impact as in the gear mechanism of the conventional setting/operating device. However, in the setting/operating device 100, the second internal gear 6, the plurality of the planetary gears 4, and the first internal gear 5 integrally revolve around the sun gear 2 in the engagement state obtained during power-off when spring return operation is performed. Accordingly, the combination of teeth of the gears that receive a return impact depends on the engagement during power-off. The combination of gears during power-off is likely to differ every time. Accordingly, unlike the gear mechanism of the conventional setting/operating device in which particular teeth receive a return impact every time, the teeth that receive a return impact can be changed every time in the setting/operating device 100.

As described above, unlike the conventional spring return type setting/operating device having the structure in which the coupling between the driving motor and the gear mechanism is disconnected, the setting/operating device 100 according to embodiment 1 has the structure in which the electromagnetic clutch 3 as the rotation control mechanism switches between the rotatable state and the unrotatable state of the first internal gear 5 functioning as the fixed internal gear of the paradox planetary gear mechanism. With this, since the second internal gear 6, the plurality of planetary gears 4, and the first internal gear 5 integrally revolve around the sun gear 2 in the engagement state obtained during power-off in spring return operation during power-off as described above, the combination of teeth of the gears that receive a return impact can be changed every time. With this, it is possible to make the service life of gears included in the gear mechanism longer than in the electric setting/operating device having the conventional spring unit in which particular teeth receive a return impact every time during spring return operation.

In addition, since the paradox planetary gear mechanism generally has a self-lock function that blocks rotation by an input torque from the output side, it is difficult to apply this mechanism as the power transmitting mechanism of the spring return type setting/operating device. However, in the power transmission portion 1 according to the embodiment, since the electromagnetic clutch 3 switches the first internal gear 5 functioning as a fixed internal gear of the paradox planetary gear mechanism from the unrotatable state to the rotatable state, the self-lock function of the paradox planetary gear mechanism can be released during spring return operation. With this, since the power transmission portion 1 can be applied as the power transmitting mechanism of the spring return type setting/operating device, it is possible to achieve a spring return type setting/operating device that has a smaller size and lower cost.

In addition, since the driving motor 8, the electromagnetic clutch 3, the power transmission portion 1, and the spring unit 9 can be disposed concentrically with the valve stem in the setting/operating device 100 according to the embodiment, it is possible to achieve the setting/operating device occupying a smaller space by suppressing the expansion of space in the horizontal direction (direction orthogonal to the valve stem).

In addition, in the spring return type setting/operating device having the conventional gear mechanism, the free torque of each gear cannot be ignored as the speed reduction ratio of the gear mechanism increases, so the spring unit and the like need to be designed in consideration of the free torque of the entire gear mechanism during spring return operation. In contrast, in the setting/operating device 100 according to the embodiment, a plurality of gears included in the gear mechanism integrally rotate during spring return operation, so the free torque of the entire gear mechanism can be ignored and the spring unit and the like can be easily designed.

Embodiment 2

Figure 3:
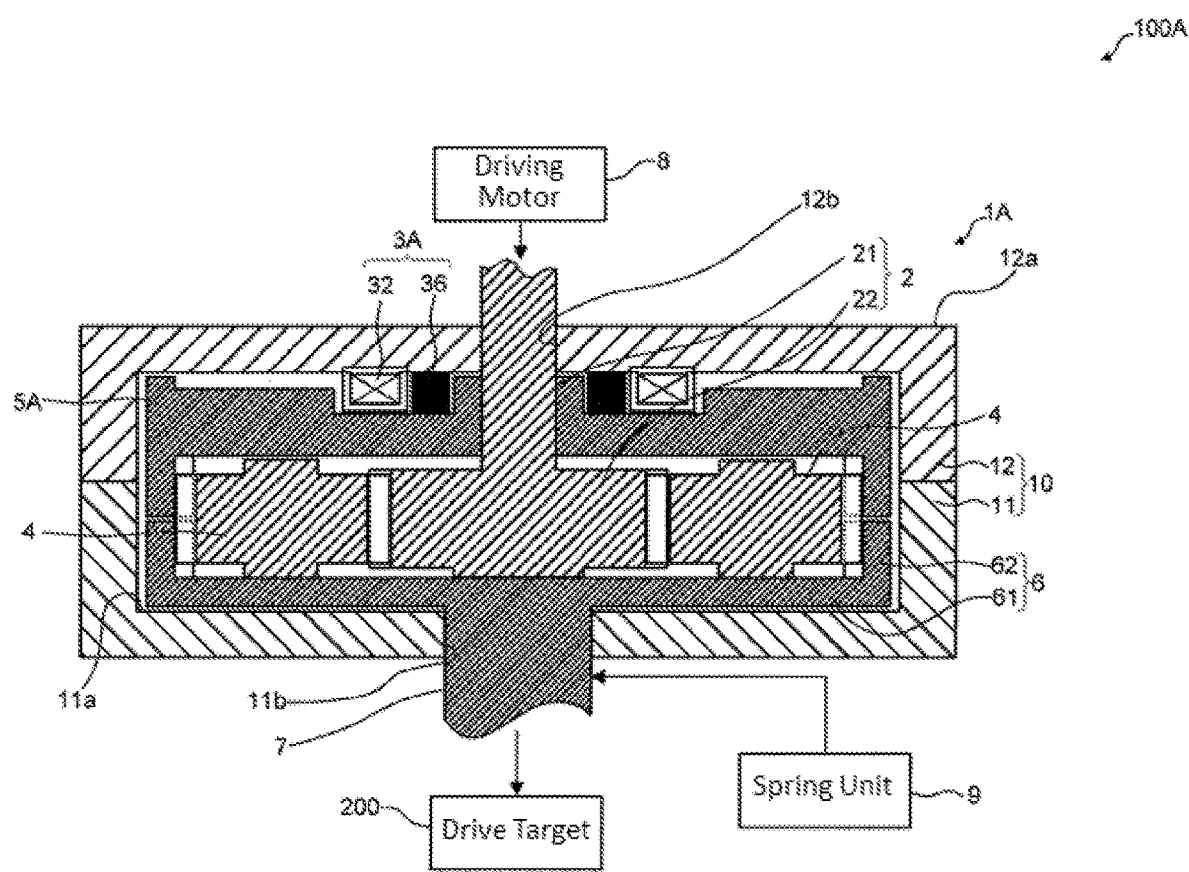
FIG. 3 is a cross-sectional view illustrating a power transmitting mechanism of a setting/operating device according to embodiment 2.

FIG. 3 is a cross-sectional view illustrating the power transmitting mechanism of the setting/operating device according to embodiment 2.

A setting/operating device 100A according to embodiment 2 is the same as the setting/operating device 100 according to embodiment 1 except that the setting/operating device 100A has a rotation control mechanism 3A including the magnetic excitation coil 32 and an iron core 36 instead of the electromagnetic clutch 3.

In the setting/operating device 100A, the magnetic excitation coil 32 and the iron core 36 included in the rotation control mechanism 3A are disposed in the housing 10. The iron core 36 is formed in, for example, a cylinder. Specifically, the iron core 36 is disposed in the gap between the inner wall of the housing 10 and a first internal gear 5A so as to surround the shaft portion 21 of the sun gear 2. Although the iron core 36 makes contact with the inner wall of the housing 10 and the first internal gear 5A, the iron core 36 is not bonded to them.

The magnetic excitation coil 32 is disposed so as to surround the iron core 36 and is fixed to the inner wall of the housing 10. The magnetic excitation coil 32 excites the iron core 36 by generating the magnetic field corresponding to the current flowing through the winding thereof.

In the setting/operating device 100A according to embodiment 2, the housing 10 and the first internal gear 5A are made of magnetic material. The housing 10 and the first internal gear 5A do not need to be configured by magnetic material entirely and at least parts of the housing 10 and the first internal gear 5A that face the iron core 36 only need to be configured by magnetic material.

When electric power is supplied to the setting/operating device 100A according to embodiment 2, current flows through the windings of the magnetic excitation coil 32 and excites the iron core 36. With this, the first internal gear 5A, the iron core 36, and the housing 10 are coupled to each other by a magnetic force and the first internal gear 5A is fixed to the housing 10 and enters the unrotatable state. With this, a power transmission portion 1A configures the paradox planetary gear mechanism, and reduces and transmits the rotating force from the driving motor 8 to the output shaft 7 using the same operation principle as in the power transmission portion 1 according to embodiment 1.

In contrast, when the supply of electric power to the setting/operating device 100A is stopped, coupling of the first internal gear 5A to the housing 10 via the iron core 36 is released. With this, the first internal gear 5A enters the rotatable state and the self-lock function as the paradox planetary gear mechanism of the power transmission portion 1A is released. When a torque is input from the spring unit 9 to the output shaft 7 in this state, the second internal gear 6, the plurality of planetary gears 4, the first internal gear 5A, and the output shaft 7 integrally revolve on the same principle as in the setting/operating device 100 according to embodiment 1 and the regulating valve can be closed.

In the setting/operating device 100A according to embodiment 2, the service life of gears included in the power transmitting mechanism can be prolonged as in the setting/operating device 100 according to embodiment 1.

In addition, since the rotation control mechanism in the setting/operating device 100A according to embodiment 2 can be achieved using a smaller number of components than in an electromagnetic clutch, the manufacturing cost of the setting/operating device can be further suppressed.

In addition, since the magnetic excitation coil 32 and the iron core 36 are accommodated in the housing 10 in the setting/operating device 100A according to embodiment 2, the setting/operating device occupying a smaller space can be achieved.

Embodiment 3

Figure 4:
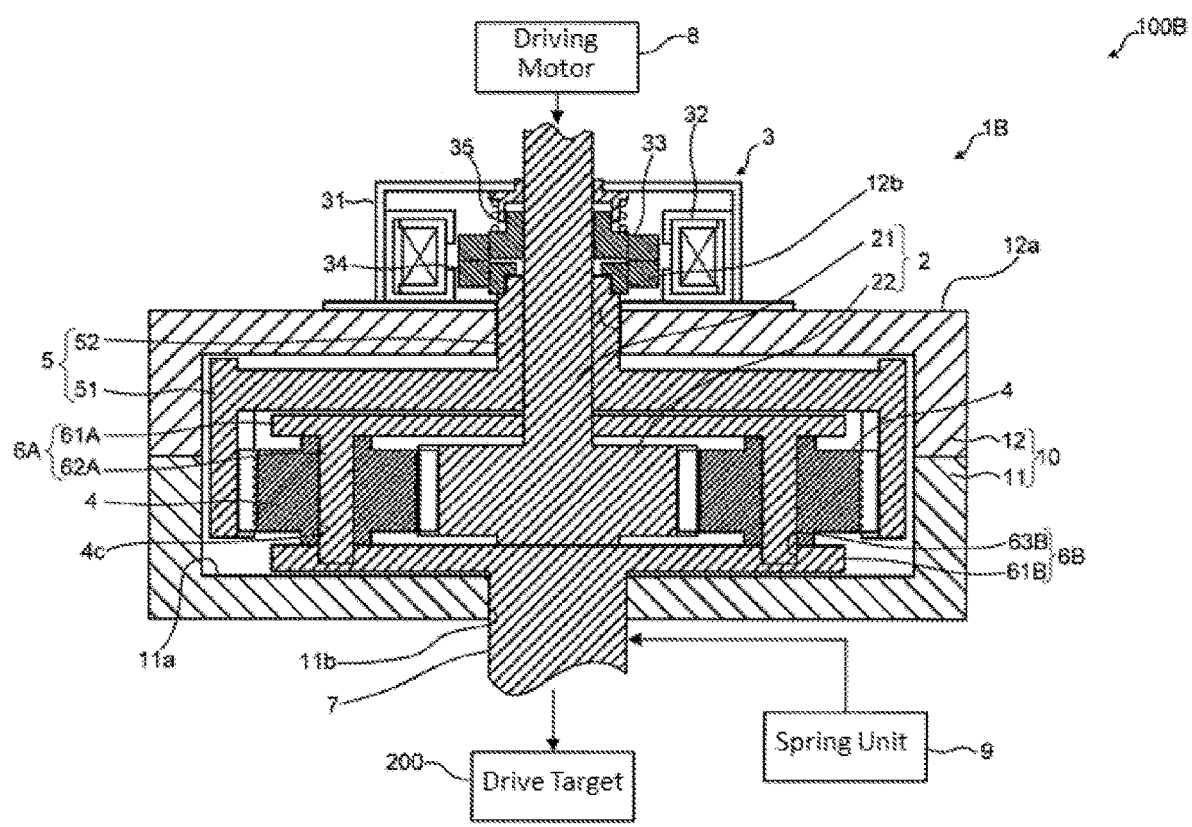
FIG. 4 is a cross-sectional view illustrating a power transmitting mechanism of a setting/operating device according to embodiment 3.

FIG. 4 is a cross-sectional view illustrating the power transmitting mechanism of the setting/operating device according to embodiment 3.

A setting/operating device 100B according to embodiment 3 is the same as the setting/operating device 100 according to embodiment 1 except that a power transmission portion 1B constitutes the planetary gear mechanism.

Specifically, the power transmission portion 1B of the setting/operating device 100B has carriers 6A and 6B that support the plurality of planetary gears 4 so as to rotate on the axes thereof in place of the second internal gear 6 as the rotation mechanism and transmit the motion of revolution of the plurality of planetary gears 4 to the output shaft 7.

The carrier 6A and the carrier 6B are disposed facing each other in parallel with the first internal gear 5 via the plurality of planetary gears 4. Specifically, the carrier 6A and the carrier 6B rotatably hold the planetary gears 4 in the direction parallel to the rotation shafts of the planetary gears 4. More specifically, the carrier 6A includes a plate 61A having the through-hole through which the shaft portion 21 of the sun gear 2 passes and a plurality of pillar portions 62A having one ends coupled to the plate 61A and passing through through-holes 4c formed along the rotation shafts of the corresponding planetary gears 4. In addition, the carrier 6B includes a plate 61B to which the output shaft 7 is coupled and a non-through-hole 63B formed in a surface opposite to the output shaft 7 of the plate 61B. The plate 61B is rotatably placed on the bottom surface 11a of the housing 10 in the state in which the output shaft 7 formed integrally with the plate 61B projects from the through-hole 11b of the bottom portion 11 of the housing 10. In addition, the other end of each pillar portion 62A of the carrier 6A is inserted into the non-through-hole 63B of the carrier 6B. With this, each planetary gear 4 is rotatably held by the carrier 6A and the carrier 6B, and the carrier 6A and the carrier 6B rotate as each planetary gear 4 revolves.

In the setting/operating device 100B according to embodiment 3, when electric power is supplied to the setting/operating device 100B, the first internal gear 5 is fixed to the housing 10 by the electromagnetic clutch 3 and enters the unrotatable state on the same principle as in the setting/operating device 100 according to embodiment 1. When the rotating force of the driving motor 8 is applied to the sun gear 2 in this state, the plurality of the planetary gears 4 disposed around the sun gear 2 revolve around the sun gear 2 along the inner peripheral surface of the fixed first internal gear 5. The carriers 6A and 6B rotate by receiving rotating forces of the planetary gears 4. With this, the output shaft 7 coupled to the carrier 6B rotates to enable the valve stem to be operated.

Figure 5:
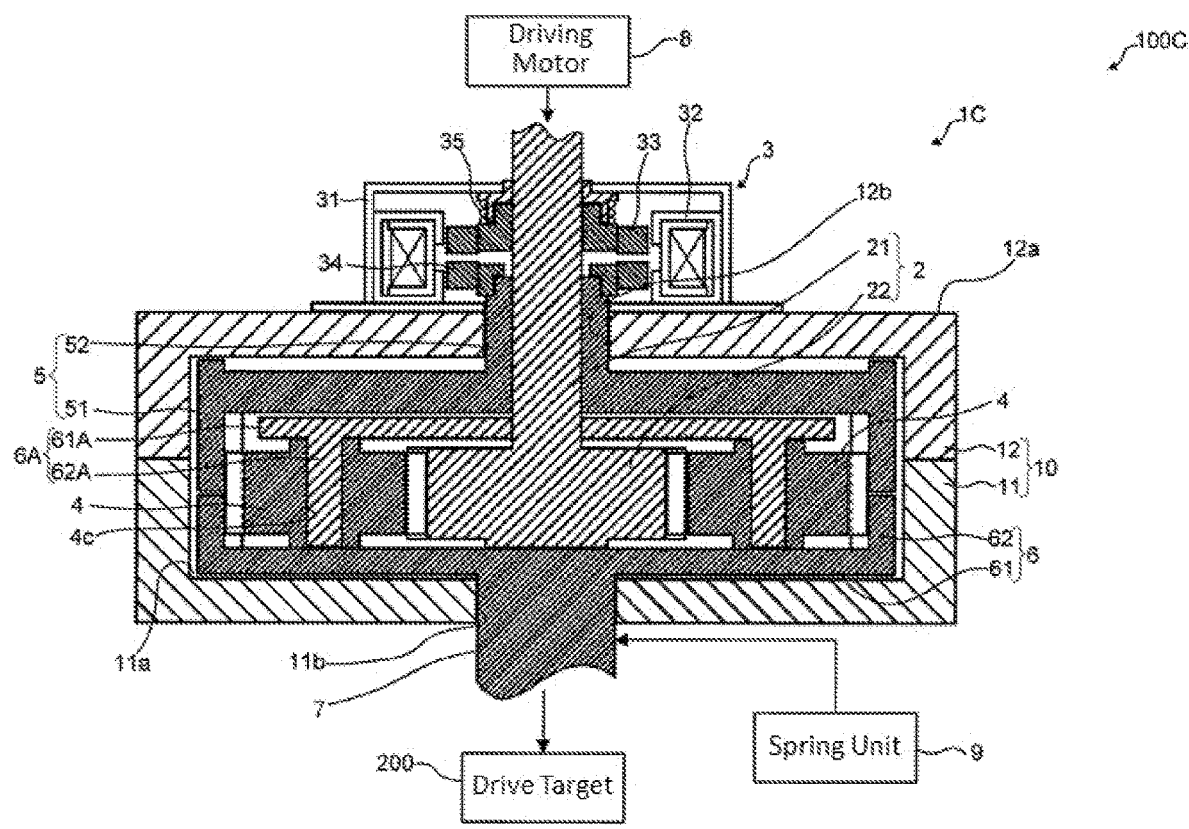
FIG. 5 is a cross-sectional view illustrating a power transmitting mechanism of a setting/operating device having the structure in which a movable internal gear and a carrier are provided.

In contrast, when the supply of electric power to the setting/operating device 100B is stopped, the first internal gear 5 becomes rotatable on the same principle as in the setting/operating device 100 according to embodiment 1, as illustrated in FIG. 5. When a torque is input to the output shaft 7 from the spring unit 9 in this state, the carriers 6A and 6B, the plurality of planetary gears 4, and the first internal gear 5 integrally rotate to rotate the output shaft 7 and close the regulating valve.

As described above, in the setting/operating device 100B according to embodiment 3, even when the planetary gear mechanism is adopted as a power transmission portion for transmitting the power of the driving motor to the valve stem, since the combination of teeth of gears that receive a return impact during spring return operation can be changed every time as in the setting/operating device 100 according to embodiment 1, the service life of gears included in the planetary gear mechanism can be prolonged.

Expansion of Embodiments

Although the invention implemented by the inventors and the like has been described above specifically based on embodiments, the invention is not limited to the embodiments and it will be appreciated that various modifications can be made without departing from the scope of the invention.

For example, although the electromagnetic clutch 3, the iron core 36, and the magnetic excitation coil 32 have been illustrated as the rotation control mechanism 3 in the setting/operating devices according to embodiments 1 and 2, the invention is not limited to these embodiments and it is possible to similarly apply the mechanism that has the structure capable of switching between the rotatable state and the unrotatable state of the first internal gear 5 according the presence or absence of electric power supply.

Figure 6:
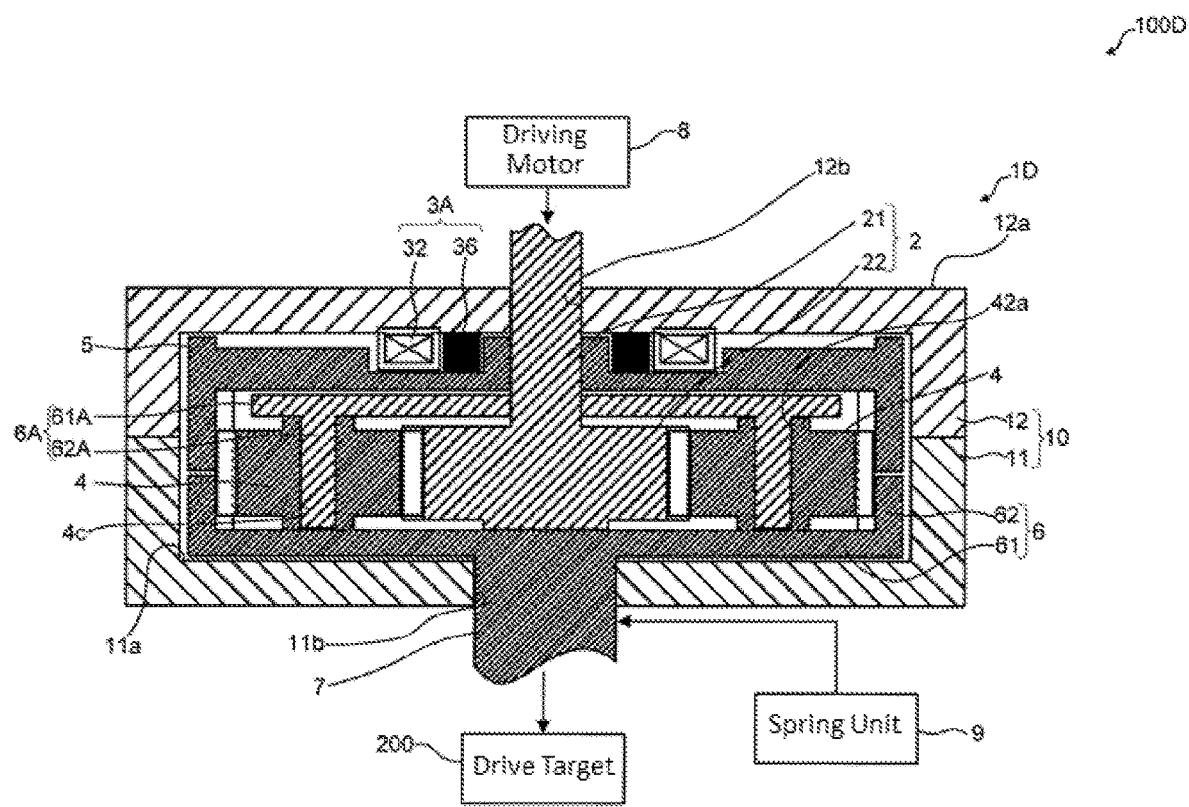
FIG. 6 is a cross-sectional view illustrating a power transmitting mechanism of another setting/operating device having the structure in which a movable internal gear and a carrier are provided.

In addition, in the setting/operating devices according to embodiments 1 and 2, the second internal gear (movable internal gear) 6 and the carriers may be used as the rotation mechanism. Specifically, as a power transmission portion 1C of a setting/operating device 100C illustrated in FIG. 5 and a power transmission portion 1D of a setting/operating device 100D illustrated in FIG. 6, the combination of the second internal gear 6 and the carrier 6A indicated in embodiment 3 may be used as the rotation mechanism. Since this enables the combination of teeth of gears that receive a return impact during spring return operation to be changed every time as in the setting/operating devices 100 and 100A according to embodiments 1 and 2, the service life of gears included in the planetary gear mechanism can be prolonged.

In addition, although use of the clutch mechanism (such as the electromagnetic clutch 3 or the iron core 36 and the magnetic excitation coil 32) that electrically operates has been illustrated in the above embodiments as the rotation control mechanism, the invention is not limited to these embodiments and a manual clutch mechanism that manually switches between the rotatable state and the unrotatable state of the first internal gear 5 may be used.

With this, the power transmission portion 1, 1A, 1B, 1C, 1D can be installed in a non-spring return type setting/operating device and the service life of gears included in the power transmitting mechanism of the non-spring return type setting/operating device can be prolonged. For example, in the non-spring return type setting/operating device, the positions of engagement between the internal gear and the planetary gears are changed periodically by integrally rotating gears included in the paradox planetary gear mechanism (or the planetary gear mechanism) using the manual clutch mechanism. With this, the combination of teeth to which a large load is applied when, for example, the regulating valve is fully closed can be changed periodically, so the service life of gears can be prolonged.

Although application of the setting/operating device 100, 100A, 100B, 100C, 100D as a setting/operating device for operating the valve stem of the regulating valve has been illustrated in the above embodiments, the invention is not limited to the embodiments. For example, the setting/operating device 100, 100A, 100B, 100C, 100D can also be applied as a setting/operating device that operates the damper shaft of a damper.

In addition, although the individual components including the sun gear 2, the planetary gear 4, the first internal gear 5, the second internal gear 6, and the output shaft 7 are made of resin material in the above embodiments, the invention is not limited to the embodiments and the individual components may be made of other material. For example, the individual components may be made of metal material (for example, steel material).

DESCRIPTION OF REFERENCE NUMERALS AND SIGNS

100, 100A, 100B, 100C, 100D: setting/operating device; 1, 1A, 1B, 1C, 1D: power transmission portion; 2: sun gear; 3: electromagnetic clutch (rotation control mechanism); 3A: rotation control mechanism; 4: planetary gear; 4c: through-hole; 5, 5A: first internal gear; 6: second internal gear (rotation mechanism); 6A, 6B: carrier (rotation mechanism); 7: output shaft; 8: driving motor; 9: spring unit; 200: drive target; 10: housing; 11: bottom portion; 11a, 12a: supporting surface; 11b, 12b: through-hole; 12: lid portion; 21: shaft portion; 22: gear portion; 31: casing; 32: magnetic excitation coil; 33: first member; 34: second member; 35: spring member; 36: iron core; 51: gear portion; 52: supporting portion; 61: supporting portion; 62: gear portion; 61A, 61B: plate; 62A: pillar portion; 63B: non-through-hole

The invention claimed is:
1. A setting/operating device comprising:
a sun gear that rotates by receiving a rotating force from a driving motor;
a first internal gear that comprises teeth on an inner peripheral surface thereof, the first internal gear being provided rotatably so as to surround the sun gear;
a plurality of planetary gears that are disposed between the sun gear and the first internal gear, engaged with the sun gear and the first internal gear, and capable of rotating on axes thereof while revolving around the sun gear;
a rotation mechanism that rotates by receiving rotating forces of the plurality of planetary gears;
an output shaft that is coupled to the rotation mechanism;
a housing that accommodates the sun gear, the first internal gear, the plurality of planetary gears, and the rotation mechanism; and
a rotation control mechanism that switches between a rotatable state and an unrotatable state of the first internal gear, wherein the rotation control mechanism comprises:
a casing that is fixed to the housing,
a first member that is disposed in the casing, the first member being made of magnetic material,
a spring member that comprises one end fixed to a part in the casing and another end coupled to the first member,
a second member disposed in the casing spaced apart from the first member so as to face the first member, the second member being made of magnetic material coupled to the first internal gear, and
a magnetic excitation coil that excites the first member and the second member.

2. The setting/operating device according to claim 1, wherein the rotation control mechanism puts the first internal gear in the unrotatable state when electric power is supplied to the driving motor and the rotation control mechanism, and
wherein the rotation control mechanism puts the first internal gear in the rotatable state when electric power is not supplied to the driving motor and the rotation control mechanism.

3. The setting/operating device according to claim 1, wherein the rotation mechanism comprises a second internal gear that is disposed concentrically with the first internal gear, that comprises teeth to be engaged with the plurality of planetary gears on an inner peripheral surface thereof, and that is provided rotatably.

4. The setting/operating device according to claim 1, wherein the rotation mechanism comprises a carrier that supports the plurality of planetary gears rotatably on the axes thereof and transmits a motion of revolution of the plurality of planetary gears to the output shaft.

5. The setting/operating device according to claim 1, wherein the rotation control mechanism puts the first internal gear in the unrotatable state by fixing the first internal gear to the housing when electric power is supplied to the driving motor and the rotation control mechanism, and
wherein the rotation control mechanism puts the first internal gear in the rotatable state by releasing the fixed first internal gear when electric power is not supplied to the driving motor and the rotation control mechanism.

* * * * *